United States Patent [19]

King

[11] Patent Number: 5,317,384
[45] Date of Patent: May 31, 1994

[54] POLARISATION STATE INSENSITIVE OPTICAL DISCRIMINATOR

[75] Inventor: Jonathan P. King, Epping, United Kingdom

[73] Assignee: Northern Telecom Limited, Montreal, Canada

[21] Appl. No.: 916,011

[22] Filed: Jul. 17, 1992

[30] Foreign Application Priority Data

Jul. 18, 1991 [GB] United Kingdom ............... 9115549

[51] Int. Cl.$^5$ ............................. G01B 9/02; H01J 5/16
[52] U.S. Cl. ................................. 356/351; 356/345; 250/227.27
[58] Field of Search ........................ 356/345, 351; 250/227.19, 227.27; 385/12, 14

[56] References Cited

U.S. PATENT DOCUMENTS

| | | | |
|---|---|---|---|
| 4,561,119 | 12/1985 | Epworth | 359/185 X |
| 4,805,235 | 2/1989 | Henmi | 359/182 |
| 4,897,543 | 1/1990 | Kersey | 356/345 X |
| 4,932,738 | 6/1990 | Haas et al. | 385/2 |
| 4,932,783 | 6/1990 | Kersey et al. | 356/351 X |
| 4,936,644 | 6/1990 | Raskin et al. | 385/2 |
| 5,008,958 | 4/1991 | Cimini et al. | 359/156 X |
| 5,104,222 | 4/1992 | Kersey et al. | 356/351 X |

FOREIGN PATENT DOCUMENTS 2107147A 4/1983 United Kingdom.

*Primary Examiner*—James C. Housel
*Assistant Examiner*—Robert Carpenter
*Attorney, Agent, or Firm*—Lee, Mann, Smith, McWilliams, Sweeney & Ohlson

[57] ABSTRACT

A polarization state insensitive optical discriminator is provided by a Mach Zehnder interferometer (21, 22, 23, 24) constructed in polarization preserving optical fibre, and two optical fibre polarization beam splitters (20, 25). Each polarization beam splitter is interconnected with the interferometer in such a way that its two orthogonally polarized outputs are launched to opposite ends of the interferometer with the same state of polarization.

9 Claims, 2 Drawing Sheets

POLARISATION STATE INSENSITIVE OPTICAL DISCRIMINATOR

BACKGROUND TO THE INVENTION

This invention relates to optical discriminators. Among the uses to which such discriminators may be put, attention is particularly drawn to those described in GB 2 107 147 A in which amplitude modulation of the optical output of an injection laser is provided by modulating that laser so as to induce frequency modulation with relatively small accompanying amplitude modulation depth, and this output is then passed through the discriminator to convert the frequency modulation to amplitude modulation with an enhanced modulation depth. This manner of achieving amplitude modulation with a substantial modulation depth can be advantageous in providing a signal of reduced spectral width compares with that produced by direct amplitude modulation of the injection laser output, and this is potentially useful in high bandwidth long distance transmission systems in which bandwidth or distance is achieved by dispersion effects.

Optical discrimination can be provided by the classical form of Mach Zehnder interferometer in which a first partial reflector divides an input signal equally into two beams which propagate for slightly different distances before being optically interfered at a second partial reflector. Interference at the second partial reflector is only complete if the two interfering beams have identical states of polarisation (SOP's). In the classical form of Mach Zehnder interferometer the light propagates in free space in its two limbs that extend from the first partial reflector to the second, and so the interfering beams do have matching SOP's. A Mach Zehnder interferometer can also be formed in optical fibre format by connecting a pair of 2×2 optical fibre 3 dB couplers optically in tandem with the two output ports of the first 3 dB coupler connected by two optical fibre links of unequal length to the two input ports of the second 3 dB coupler. Birefringence can be introduced into circularly symmetric single (degenerate) mode optical fibre by bending it or twisting it, and therefore an optical fibre format of Mach Zehnder may include a certain amount of birefringence in its two limbs. If the birefringence is not the same in the two limbs, the SOP's at the second 3 dB coupler may not be matched, in which case interference is incomplete—and in the worst possible case may have orthogonal SOP's, in which case there is no interference whatever.

When polarised light propagates in a certain direction through birefringent material its SOP does not in general remain constant, but evolves in a manner that is conveniently described with reference to a Poincaré sphere as depicted in FIG. 1. On this sphere the points H and V represent horizontally and vertically polarised states, the points L and R represent left-handed and right-handed circularly polarised states, and the points P and Q represent two linearly polarised states with polarisation planes inclined at 45° to the horizontal and vertical planes. Each possible state of elliptically polarised light is similarly represented by some point on the sphere lying between the equatorial great circle through HQVP and the two poles L and R. Thus on the Poincaré sphere all orthogonally polarised states are represented by diametrically opposed points on the sphere. For light propagating in a particular direction through a birefringent medium there are two particular orthogonal SOP's, known as eigenstate SOP's, which will propagate without change of SOP. Light launched into the medium in that particular direction with any other SOP will propagate through the medium with its SOP steadily evolving in a manner that describes a circle on the Poincaré sphere that passes through the starting point SOP and lies in a plane normal to the eigenaxis that joins the two eigenstate SOP's.

Therefore, if there is birefringence in the two limbs of a Mach Zehnder interferometer, it can still function on its own as an efficient optical discriminator provided that it is arranged that the light is launched so that it propagates in the two limbs with eigenstate SOP's, or if the birefringence is arranged so that the SOP's evolve in the two limbs in a manner providing matching SOP's at the far end.

SUMMARY OF THE INVENTION

The present invention is directed to a design of discriminator which incorporates a form of Mach Zehnder interferometer with birefringent limbs, but which is capable of operation with any arbitrary input SOP to the discriminator and does not have to have its limbs adjusted to alter their relative birefringence to produce matching SOP's at the far ends of those limbs of the Mach Zehnder interferometer.

According to the present invention there is provided a polarisation state insensitive optical discriminator having a Mach Zehnder interferometer with birefringent optical fibre limbs.

The invention further provides a polarisation state insensitive optical discriminator having a Mach Zehnder interferometer with birefringent limbs optically interconnected with two polarisation beam splitters such that an optical signal of arbitrary state of polarisation (SOP) launched into one port of either polarisation beam splitter is separated into two orthogonally polarised components and launched into the Mach Zehnder interferometer to propagate with substantially the same SOP in opposite directions through its two limbs, which SOP is substantially matched with one of the birefringence eigenstate SOP's of those limbs of the Mach Zehnder interferometer.

The Mach Zehnder interferometer with birefringent limbs may conveniently be a Mach Zehnder interferometer constructed in optical fibre format using polarisation preserving optical fibre. The two polarisation beam splitters may similarly be constructed in optical fibre format, and may also be constructed using polarisation preserving optical fibre.

BRIEF DESCRIPTION OF THE DRAWINGS

There follows a description of a polarisation state insensitive optical discriminator embodying the invention in a preferred form. The description refers to FIG. 2 of the accompanying drawings in which.

DETAILED DESCRIPTION OF A PREFERRED EMBODIMENT

Figure 1:
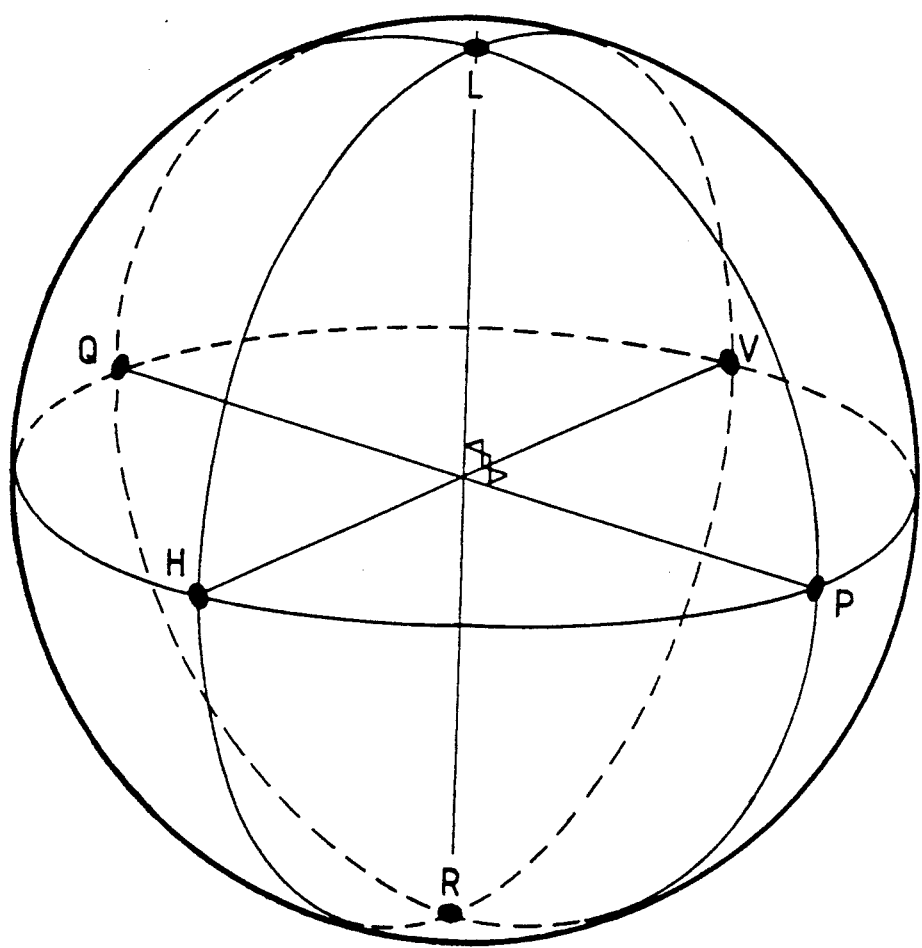
FIG. 1 is a Poincaré sphere diagram.
Figure 2:
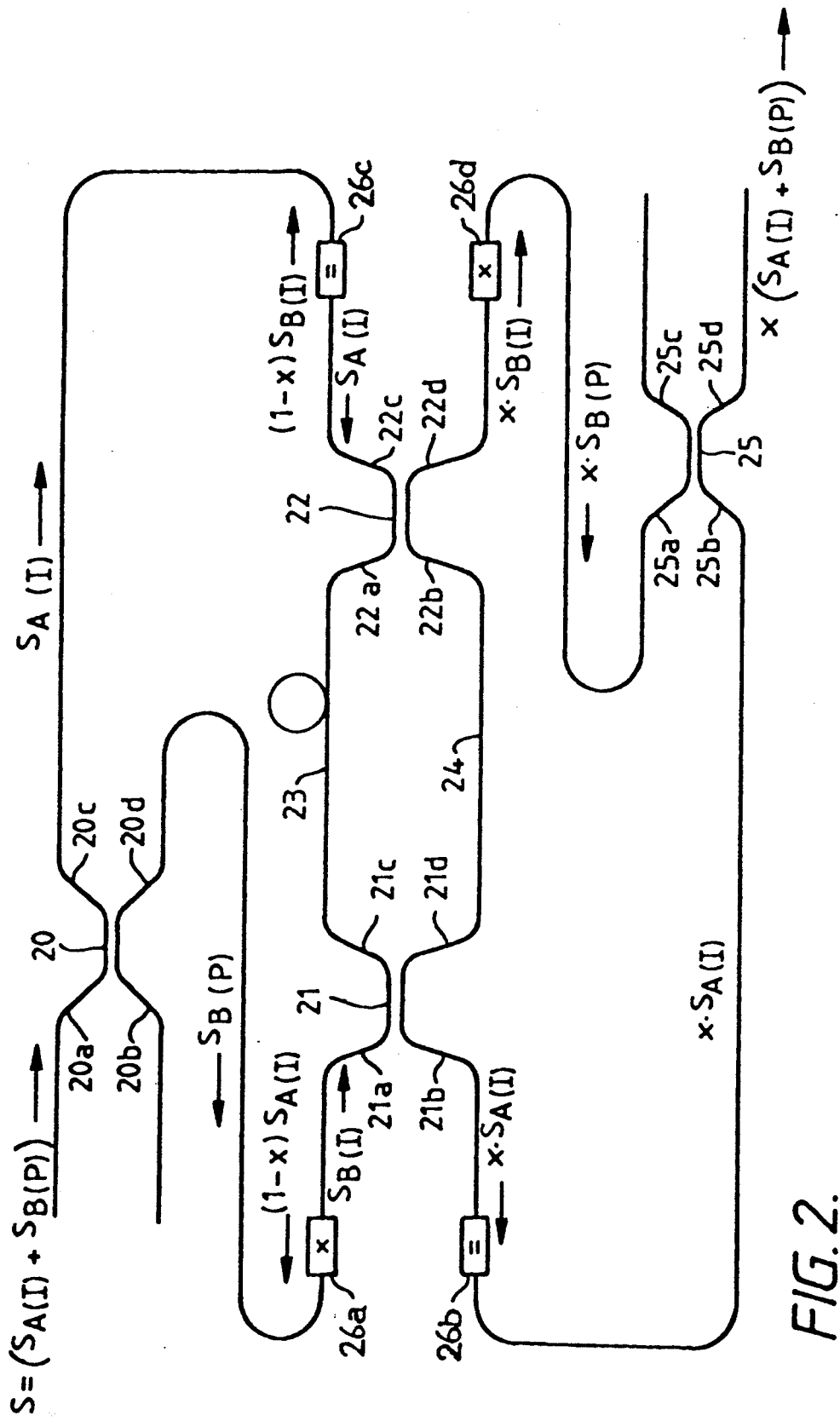
FIG. 2 is a schematic diagram of the discriminator.

The two 3 dB beam splitters of the Mach Zehnder interferometer of FIG. 2, and the two associated polarisation beam splitters, are all constructed in optical fibre format using the progressive stretching method of making fused fibre tapered couplers that is described in GB 2 150 703 A to which attention is directed. GB 2 150 703

A describes how its progressive stretching method can be continued beyond the point at which the coupling is first strong enough to produce 3 dB coupling, while GB 2 170 920 A describes how it can be continued to the point at which the resulting coupler acts as a polarisation beam splitter. Both these specifications describe the application of the progressive stretching method of making fused couplers to the manufacture of such couplers using single (degenerate) mode circularly symmetric fibre, while GB 2 190 762 A explains how the progressive stretching method can fail to produce satisfactory results when attempting to make couplers using certain types of high birefringence polarisation preserving fibre. In particular, GB 2 190 762 A describes how this problem can be circumvented by splicing in a stub length of circularly symmetric single mode fibre into each of the two lengths of polarisation preserving fibre from which it is intended to produce a progressively stretched fused fibre tapered coupler, and then arranging that the progressive stretching shall be confined to the region of the two spliced in stub lengths. The lack of satisfactory results, when attempting to form progressively stretched fused fibre tapered couplers directly from certain types of high birefringence fibres, results from the use of stress inducing filaments in the optical claddings of those fibres that have a refractive index significantly greater than that of the cladding in which they are embedded. This produces unacceptable attenuation because power is coupled into modes that take account of the waveguiding structure that is provided by those filaments. Instead of having recourse to the use of stub lengths of circularly symmetric single mode fibre to overcome this problem, it may alternatively be overcome by the use of type of birefringent fibre that is less highly birefringent, and hence may be characterised as 'medium birefringent', and which employs, embedded in the cladding, stress inducing filaments that have a refractive index matched with that of the cladding. With this type of medium birefringence fibre it is possible to make, without recourse to stub lengths of circularly symmetric single mode fibre, satisfactory fused fibre tapered couplers not only of the conventional 3 dB beam splitter type, but also of the polarisation beam splitting type.

Referring to FIG. 2, the input to the optical discriminator is provided by one input port 20a of an optical fibre polarisation beam splitter 20. The two output ports 20c and 20d of the optical fibre polarisation beam splitter 20 are respectively coupled by splices 26c and 26a to ports 22c and 21a of a Mach Zehnder interferometer formed by two 3 dB optical fibre beam splitters 21 and 22 connected by optical fibre limbs 23 and 24 of unequal optical path length which respectively link ports 21c and 21d of 3 dB beam splitter 21 with ports 22a and 22b of 3 dB beam splitter 22. Similarly the output of the discriminator is provided by one output port 25d of an optical fibre polarisation beam splitter 25 having input ports 25a and 25b respectively coupled by splices 26d and 26b to port 22d of 3 dB coupler 22 and to port 21b, of 3 dB coupler 21.

The two 3 dB couplers 21 and 22 of the Mach Zehnder interferometer, and its two limbs 23 and 24, are constructed of polarisation preserving fibre so that polarisation state is preserved from port to port of the device. Preferably the polarisation preserving fibre is of the medium birefringence type that allows fused fibre tapered couplers to be constructed from that fibre, but it can alternatively be made of other types of polarisation preserving fibre for which direct construction is not possible, and which therefore require the splicing in of stub lengths of circularly symmetric single mode fibre from which to make the coupling regions in the manner described in GB 2 190 762 A.

Known forms of polarisation preserving optical fibre exhibit linear birefringence, and so the two eigenstate SOP's for light propagating along such fibre are orthogonally related linear SOP's which can be characterised as polarised in the plane that contains the axes of the stress inducing filaments of the fibre (I polarised), and the other as polarised perpendicular to that plane (P polarised). If an I polarised signal of a certain frequency is launched into the Mach Zehnder interferometer by way of port 21a, then this signal will be divided equally between limbs 23 and 24 which will convey the two portions to 3 dB coupler 22 where there will be total interference since two portions have exactly matching SOP's. This will produce a sharing of an output signal of the Mach Zehnder interferometer between ports 22c and 22d in a proportion dependent upon the phase difference produced by the difference in optical path length of the two limbs 23 and 24. Similarly, if a P polarised signal of the same frequency is launched into the Mach Zehnder interferometer by way of port 21a, this will produce a sharing of an output signal between ports 22c and 22d in a proportion dependent upon the phase difference produced by the difference in optical path length of the two limbs 23 and 24. The difference in physical path length is the same in both instances but, because the fibres are birefringent, the difference in optical path length (being the product of physical path length with effective refractive index) is different in the two instances. Therefore the division of optical power between the two ports 22c and 22d will in general be different for the two polarisations. It is clear therefore that the Mach Zehnder interferometer will not work on its own as an optical discriminator for input signals of all different SOP's but will only work for the two birefringence eigenstate SOP's I and P.

The function of a polarisation beam splitter is to separate a signal applied to one of its input ports into two orthogonally polarised components which issue from separate output ports. In the case of known forms of optical fibre polarisation beam splitters these two components may be characterised as linear SOP's and, if the polarisation beam splitter is constructed using polarisation preserving optical fibre (with or without circularly symmetric single mode fibre stubs for the coupling region) these two SOP's are the I and P SOP's to which previous reference has been made in connection with the Mach Zehnder interferometer.

In the case of polarisation beam splitter 20 it is assumed by way of example that, for a signal S applied to input port 20a, the I polarised component emerges from port 20d. Therefore, if the signal S applied to port 20a can be resolved into an I polarised component $S_A$ and a P component $S_B$, then the signal to emerge from port 20c is $S_A$, and is I polarised. This signal is designated $S_{A(I)}$, where the suffix within parenthesis designates the SOP of the signal. Correspondingly the signal to emerge from port 20d is $S_{B(P)}$.

The signal $S_{A(I)}$ emerging from port 20c of polarisation beam splitter 20 is launched into port 22c of the Mach Zehnder interferometer via splice 26c. In this splice 26c, and also in splice 26b, the fibres are spliced with the two fibres in a relative orientation in which the plane in one fibre that contains the axes of its stress inducing filaments is coplanar with the corresponding plane in the other fibre. This form of splice will be referred to as a "straight" splice (indicated in FIG. 2 by '=') to distinguish it from the form of splice employed for splices 26a and 26d, which will be referred to as "90° twist" splices (indicated in FIG. 2 by '×'), where the relative orientation of the two fibres is such that the plane in one fibre that contains the axes of its stress inducing filaments is at 90° to the corresponding plane in the other fibre. Since splice 26c is a "straight" splice, the signal $S_{A(I)}$ emerging from port 20c of polarisation beam splitter 20 is launched into port 22c of the Mach Zehnder interferometer to continue as an I polarisation state signal, the signal $S_{A(I)}$, in the fibre of port 22c. In the case of the signal $S_{B(P)}$ emerging from port 20d of polarisation beam splitter 20, this signal $S_{B(P)}$ is launched into port 21a of the Mach Zehnder interferometer via splice 26a which is a "90° twist" splice. Therefore the signal $S_{B(P)}$ emerging from port 20d of polarisation beam splitter 20 is launched into port 21a, not as a P polarisation signal, but as an I polarisation signal. Thus the signal $S_{B(P)}$ emerging from port 20d of polarisation beam splitter 20 is launched into port 21a as the signal $S_{B(I)}$.

Considering first the signal $S_{A(I)}$ launched into port 22c of the Mach Zehnder interferometer, this signal is launched with an SOP corresponding to one of the birefringence eigenstates (eigenstate I) of the interferometer. Therefore the 3 dB beam splitter 22 will divide $S_{A(I)}$ into two equal amplitude portions launched respectively into limbs 23 and 24 to emerge with matching SOP's at ports 21c and 21d of 3 dB beam splitter 21. The two portions interfere in 3 dB beam splitter 21 to produce an output $x.S_{A(I)}$ from port 21b and an output $(1-x) S_{A(I)}$ from port 21a, where x is a factor lying in the range from 0 to 1 whose magnitude depends upon the phase relationship between the interfering signals.

Similarly signal $S_{B(I)}$ launched into port 21a of the Mach Zehnder interferometer is directed by the 3 dB beam splitter 21 into two equal amplitude portions launched respectively into limbs 23 and 24 to emerge with matching SOP's at the ports 22a and 22b of 3 dB beam splitter 22. Here they interfere to produce an output $x.S_{B(I)}$ from port 22d and an output $(1-x) S_{B(I)}$ from port 22c. The factor x is the same in both instances because the physical path length difference is the same in both instances, as are the propagating modes, thereby providing the same optical path length difference and hence the same phase relationship between the interfering signals.

Signal $x.S_{A(I)}$ emerging from port 21b of 3 dB beam splitter 21 is coupled to port 25b of polarisation beam splitter 25 via splice 26b, which is a straight splice, and so the signal is launched into port 25b as $x.S_{A(I)}$. Correspondingly, signal $x.S_{B(I)}$ emerging from port 22d of 3 dB beam splitter 22 is coupled to port 25a of polarisation beam splitter 25 via splice 26d, which is a "90° twist" splice, and so the signal is launched into port 25a as $x.S_{B(P)}$. The polarisation beam splitter 25 combines the signal applied to its ports 25a and 25b to emerge as the combined signal $x (S_{A(I)}+S_{B(P)})$ from its output port 25d.

It can be readily verified that the parts of the signal $(1-x) S_{A(I)}$ and $(1-x) S_{B(I)}$, respectively emerging from ports 21a and 22c of the Mach Zehnder interferometer, are also combined to form the signal $(1-x)(S_{A(I)}+S_{B(P)})$ which emerges from port 20a of polarisation beam splitter 20.

It has previously been stated that the polarisation beam splitters 20 and 25 are made of polarisation preserving fibre with or without circularly symmetric single mode fibre stubs for the coupling region. However, since preservation of SOP is not generally a required feature for the light launched into the discriminator via its polarisation beam splitter 20 until the coupling region is reached, or similarly for the light emerging from the discriminator via its polarisation beam splitter 25, it can be seen that there is no need for ports 20a and 20b, or ports 25c and 25d, to be constructed in polarisation preserving fibre rather than circularly symmetric single mode fibre. Accordingly, these two polarisation beam splitters can each be constructed from a pair of fibres each consisting of a length of circularly symmetric single mode fibre spliced to a length of polarisation preserving fibre. In such instances the coupling region is created adjacent the splices. If the polarisation preserving fibre is of the high birefringence type with index mismatched stress inducing filaments, the coupling region will of course have to be on the circularly symmetric single mode fibre side of the splices.

I claim:

1. A polarisation state insensitive optical discriminator comprising a Mach Zehnder interferometer with two birefringent limbs which interferometer is optically interconnected with first and second polarisation beam splitters, wherein the Mach Zehnder interferometer has first and second ports at one end of its birefringent limbs and third and fourth ports at the other, wherein each of the first and second polarisation beam splitters has first and second ports and third and fourth ports, wherein the first, third, second and fourth ports of the Mach Zehnder interferometer are respectively optically interconnected with the fourth and third ports of the first polarisation beam splitter and the second and first ports of the second polarisation beam splitter with relative alignments such that an optical signal of arbitrary state of polarisation (SOP) launched into one port of one of the polarisation beam splitters selected from the group consisting of the first and second ports of the first polarisation beam splitter and the third and fourth ports of the second polarisation beam splitter is separated into two orthogonally polarised components and launched into the Mach Zehnder interferometer to propagate with substantially the same SOP in opposite directions through said two limbs, which SOP is substantially matched with one of the birefringence eigenstate SOP's of said limbs of the Mach Zehnder interferometer.

2. A polarisation state insensitive optical discriminator according to claim 1, wherein the Mach Zehnder interferometer is an optical fibre interferometer.

3. A polarisation state insensitive optical discriminator according to claim 2, wherein the polarisation beam splitters are optical fibre polarisation beam splitters.

4. An optical transmission system comprising at least one polarisation state insensitive optical discriminator, said at least one optical discriminator including a Mach Zehnder interferometer with two birefringent limbs which interferometer is optically interconnected with first and second polarisation beam splitters, wherein the Mach Zehnder interferometer has first and second ports at one end of its birefringent limbs and third and fourth ports at the other, wherein each of the first and second polarisation beam splitters has first and second ports and third and fourth ports, wherein the first, third, second, and fourth ports of the Mach Zehnder interferometer are respectively optically interconnected with the fourth and third ports of the first polarisation beam splitter and the second and first ports of the second polarisation beam splitter with relative alignments such that an optical signal of arbitrary state of polarisation (SOP) launched into one port of one of the polarisation beam splitters selected from the group consisting of the first and second ports of the first polarisation beam splitter and the third and fourth ports of the second polarisation beam splitter is separated into two orthogonally polarised components and launched into the Mach Zehnder interferometer to propagate with substantially the same SOP in opposite directions through said two limbs, which SOP is substantially matched with one of the birefringence eigenstate SOP's of said limbs of the Mach Zehnder interferometer.

5. An optical transmission system according to claim 4, wherein the interferometer of said at least one polarisation state insensitive optical discriminator is an optical fibre interferometer.

6. An optical transmission system according to claim 5, wherein the polarisation beam splitters of said at least one discriminator are optical fibre polarisation beam splitters.

7. An optical transmission system according to claim 4, further comprising an injection laser, and modulation means for providing a frequency modulated optical output from said laser, wherein the frequency modulated output is applied to said discriminator.

8. An optical transmission system according to claim 7, wherein the Mach Zehnder interferometer of said discriminator is an optical fibre interferometer.

9. An optical transmission system according to claim 8, wherein the polarisation beam splitters of said discriminator are optical fibre polarisation beam splitters.

* * * * *